April 1, 1969     A. COSTA ET AL     3,435,692
BIDIRECTIONAL STEP BY STEP FEEDING DEVICE FOR A RECORD
SUPPORT, FOR EXAMPLE A PUNCHED TAPE
Filed June 26, 1967

INVENTORS
ARMANDO COSTA
GIOVANNI CERUTTI
BY *John Toggenburger*
AGENT

United States Patent Office 3,435,692
Patented Apr. 1, 1969

3,435,692
BIDIRECTIONAL STEP BY STEP FEEDING DEVICE FOR A RECORD SUPPORT, FOR EXAMPLE A PUNCHED TAPE
Armando Costa and Giovanni Cerutti, Ivrea, Turin, Italy, assignors to Ing. C. Olivetti & C. S.p.A., Ivrea, Italy, a corporation of Italy
Filed June 26, 1967, Ser. No. 648,768
Claims priority, application Italy, June 27, 1966, 15,085/66
Int. Cl. F16h 27/10
U.S. Cl. 74—125.5         4 Claims

ABSTRACT OF THE DISCLOSURE

A bidirectional shaft for a record moving roll is rotatable by a differential gear system comprising two sun bevel gears coaxially arranged with said shaft and a planetary bevel gear turnably situated therebetween on a pivot stud which extends radially from said shaft. Said sun gears are rotatable through individual clutches, one through one of said clutches to drive it in one direction a given distance, the other through the other of said clutches to drive it in the other direction half of said given distance. If both clutches are engaged, the roll turning shaft, due to opposite concomitant rotation of said sun gears, will first stand still while a recording apparatus functions, and then will receive a record feeding step. If only said other clutch is engaged then said shaft will receive a back spacing step.

Background of the invention

This invention relates to a bidirectional step by step feeding device for a record element, for example a punched tape, having a feeding member driving shaft adapted to be rotated by a differential gear system comprising a planetary bevel gear which is rotatably mounted on a pivot stud carried on and radially extending from said driving shaft, and comprising further a pair of sun bevel gears individually rotatable coaxially on said driving shaft but in opposite direction and adapted each to be controlled by a related clutch.

Several punched tape feeding devices for punched records are already known wherein the tape is advanced by a pawl and a ratchet wheel mechanism. These feeding devices are unreliable for high speed perforators as well as for high speed readers. Furthermore, they require separate feeding means for back spacing the tape.

In a known tape reader, the tape is fed by a differential gear system, the sun gears of which are frictionally driven, whereby the tape is not reliably fed.

Summary of the invention

The feeding device of the invention is characterized by that a first toothed driving member is continuously rotated in a predetermined direction and is part of a first clutch which is conditionable to impart to a first driven member positively a given angular stroke to positively rotate in one direction a first sun gear of said pair, and is further characterized by that a second toothed driving member which also is continuously rotated, but in a direction opposite to said first driving member, is part of a related second clutch which is conditionable to impart to a second driven member positively a longer angular stroke, thereby to positively rotate a second sun gear in a direction opposite to that in which the first sun gear is driven.

The two driven members are each associated with one of the sun bevel gears to drive them in opposite directions at equal rates of speed. Thus if the clutches related to the two driving gears are closed concomitantly, the driven members related thereto will drive their related sun bevel gears over the said given angular stroke together but reversely to each other. Therefore during such stroke and time the driving shaft for the record element feeding shaft will stand still. Then, because the second driven member has a greater angular stroke, it continues to drive the second driven member and thus continues to drive its related sun beevl gear and consequently causes the record feeding shaft to turn in record advancing direction one step.

On the other hand, if the second clutch alone is operated, then only the second driven member is imparted an operating stroke and this causes the record feeding shaft to rotate in a reverse direction to back space the record element a single step.

This and other characteristics of the invention will become apparent from the following description of a preferred embodiment thereof and from the accompanying drawings.

Description of the preferred embodiments of the invention

Figure 1:
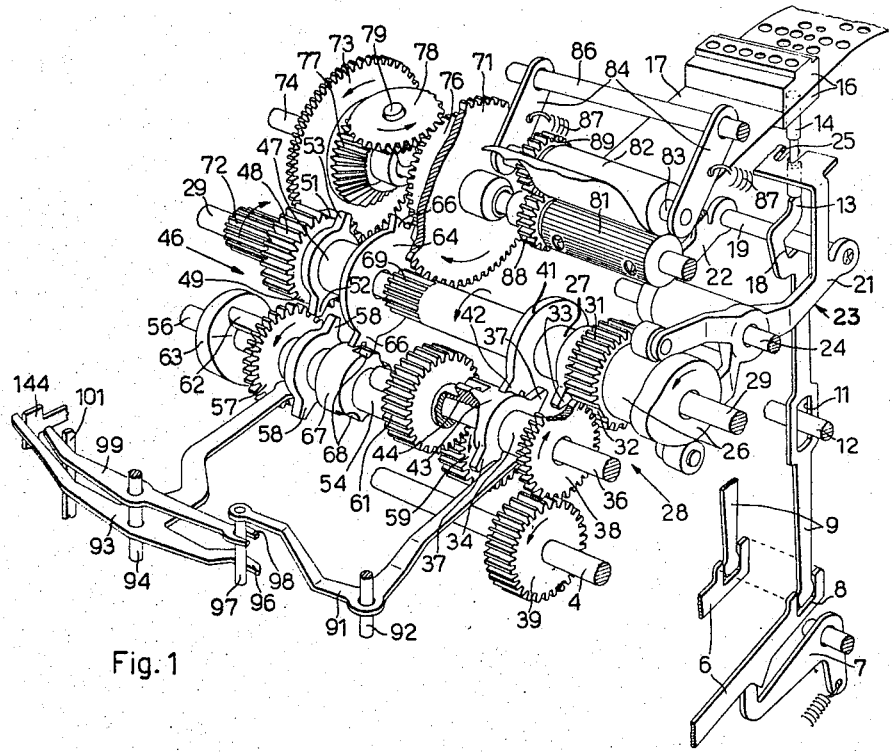
FIG. 1 is a partial left hand rear perspective view of a punching apparatus incorporating a tape feeding device according to the invention.

With reference to the FIG. 1, the numeral 4 indicates a motor shaft of a tape punching device incorporated in a teleprinter of the start stop type. In the aspect in which the shaft 4 is shown in FIG. 1, it is continuously power-rotated counterclockwise, in a known manner. The punching apparatus comprises a set of code bars 6 adapted to selectively assume one of two positions determined by a corresponding spring urged locking member 7. Each bar 6 is provided with a notch 8 engaging a related interponent 9 which is provided with a slot 11. A stationary shaft 12 extends through all the slots. Each interponent 9 is provided with a projection 13 by which it is adapted to operate a related punch 14. The punches 14 cooperate with a die member 16 having a slot for guiding a record element or tape 17 which is required to be perforated.

Each interponent 9 is provided with a notch 18 adapted to selectively engage a universal bar 19 of a bail structure 23 which is rockably mounted on a stationary shaft 24 and comprises a pair of supporting arms 21, 22 for the bar 19. The bail structure 23 is provided with a comb portion 25 for restoring the punches 14. The arm 21, by a forward extension cooperates with a pair of complementary cams 26 secured to a first driven sleeve member 27 which is part of a first clutch, generically indicated by the numeral 28. The sleeve 27 is rotatably mounted on a stationary shaft 29 but is axially stationary. On the sleeve 27 is a first driven pinion 31 having a single mutilated portion 32, a starting element or tooth 33 being secured to the sleeve 27 in an angular position corresponding to that of the mutilated portion 32. Furthermore, the clutch 28 comprises a driving member or sleeve 34 rotatable on a second shaft 36, and axially shiftable or slidable thereon from a normal lateral position shown in FIG. 1 rightwardly to a shifted position. Secured to the sleeve 34 is a first driving pinion 38 located axially in corresponddence with pinion 31 and intermeshing with a pinion 39 which is secured to the continuously rotating shaft 4, whereby the sleeve 34 is continuously rotating clockwise. The pinions 31 and 39 are of appropriate width in respect to the pinion 38 for the latter to remain in mesh with the former in either of the axially different positions of the sleeve 34. A pair of diametrically opposite counter elements or starter teeth 37 on the sleeve 34 are adapted to come into driving alignment with the tooth 33 through an axial shift of the sleeve 34 rightwardly so that then the tooth 37 initially rotates the sleeve 27 through the tooth 33 and thereby rotates the pinion 31 into geared, meshed relation with the pinion 38.

Secured to the sleeve 27 is also a stop element in the form of a tooth 42 carried by a disk 41, the tooth 42 being located on the disk 41 in an angular position which corresponds to that of the mutilated portion 32 and adapted by movement against the cylindrical portion to stop and hold the sleeve 27 each time it completes a 360 degree rotation. Always while the sleeve 34 is in the normal axial position shown in FIG. 1, the cylindrical portion 43 of the sleeve 34, by assuming gliding contact with the tooth 42, holds the sleeve 27 rotatively at rest so that the mutilated portion 32 of the pinion 31 then faces the pinion 38 idly. Furthermore, the cylindrical portion 43 of the sleeve 34 is provided with a double groove 44 which as viewed in FIG. 1 is normally located to the left of the tooth 42. If the sleeve 34 is shifted rightwardly, its double groove 44 affords clearance for the tooth 42 when the tooth 37 starts to rotate the sleeve 27 by its tooth for a cyclic turn.

A second clutch, generically indicated by the numeral 46, comprises a second driven sleeve member 47 which is rotatably mounted on the shaft 29 and axially stationary thereon. Secured to the sleeve member 47 is a driven pinion 48 having two diametrically opposite mutilated portions 49 and 51 in a common plane. Two diametrically opposite starting elements or teeth 52 and 53 are on the sleeve 47 in a single plane and in angular positions thereon corresponding to the mutilated portions 49 and 51.

Figure 3:
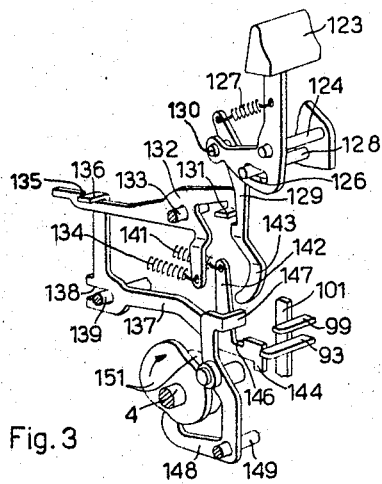
FIG. 3 is a partial right hand rear perspective view of another detail of the control mechanism for the feeding device.

Furthermore, the clutch 46 comprises a driving member or sleeve 54 continuously rotating on another stationary shaft 56 and axially shiftable thereon from a normal rightward rest position in FIG. 1, leftwardly position. Secured to the sleeve 54 is a second driving pinion 57 for the pinion 48, and another pinion 59 is in constant mesh with a pinion 61 which is unitarily turnable with the sleeve 34, whereby the sleeve 54 with the pinion 57 is continuously rotated in a direction opposite to that of the pinion 38. A pair of diametrically opposite counter-elements or teeth 58 secured to the sleeve 54, by axial shift of the latter, are adapted to be shifted into a common plane with the teeth 52, 53, when the sleeve 54 in the aspect shown in FIG. 1 is shifted leftwards. In response to each signal code received which needs to be recorded on the record tape 17, both clutches 28 and 46 are synchronously closed, the clutch 46 for a half turn and the clutch 28 for a full turn. As will be seen later, such clutching action causes in sequence a record tape punching action and a step feed of the record tape 17. On the other hand the clutch 46 alone may be closed by the operator of a back spacing key or lever 123 (FIG. 3). If that is done, a 180° rotation of the sleeve 47 by the sleeve 54 results, which in a manner later explained, back spaces a record feeding roll 81.

Secured to the pinion 57, and thus rotatable with the sleeve 54 is a pin 62 at each of two 180° separated points for cooperation with a stationary cam 63 secured to the non-rotating shaft 56. Furthermore, carried on the sleeve 54 is a disk 64 with a pair of diametrically opposite second stop elements or teeth 66, the teeth 66 being in a common plane and in angular positions corresponding to the locations of the mutilated portions 49, 51 of the pinion 48. Each tooth 66 is adapted to stop the sleeve 47 upon 180 degrees rotation of the same. After the tooth 66 has been stopped, the cylindrical portion 67 of the sleeve 54 is in gliding contact with the tooth and thus holds the sleeve 47 normally at rest with one of the corresponding mutilated portions 49, 51 facing the pinion 57. Finally, the cylindrical portion 67 of the sleeve is provided with a pair of diametrically opposite axial double grooves 68 which normally are located at the right of the teeth 66. The grooves 68 allow rotation of the teeth 66 in concert with the rotors 43 when as the sleeve 54 is axially shifted the teeth 58 are brought into the plane of the teeth 52, 53.

The tape feeding device comprises a differential gear system having a planetary bevel gear 78 and a pair of sun bevel gears 76 and 77 meshing with the gear 78. The gears 76 and 77 are rotatably mounted on a shaft 74 which in turn rotatably mounted on the machine frame. Furthermore, the gears 76 and 77 are integral with a toothed wheel 71, and a toothed wheel 73 and these wheels are respectively meshing with driven pinions 69, and 72 which are respectively unitary with the sleeves 27, and 47. The planetary gear 78 is rotatable on a pivot stud 79 carried in a radial relation on a shaft 74.

Secured to the shaft 74 is also a tape feeding member in the form of a knurled roller 81 which is normally cooperating with a counterroller 82 to yieldably pinch the tape 17 therebetween. The counterroller 82 is rotatable on a shaft 83 secured to a pair of arms 84 fulcrumed on a stationary shaft 86 and is urged against the roller 81 by a pair of springs 87. Secured to the roller 81 is a pinion 88, meshing with a similar pinion 89 secured to the counterroller 82.

The sleeve 34 is shiftable into clutch closing position by a lever 91 which is fulcrumed on a stationary shaft 92, whereas the sleeve 54 is shiftable into clutch closing position by a lever 93 which is fulcrumed on another stationary shaft 94. The lever 93 is provided with a branch 96 which cooperates with a pin 97 of the lever 91. The pin 97 engages also a notch 98 of a lever 99 pivoted on the shaft 94.

Figure 2:
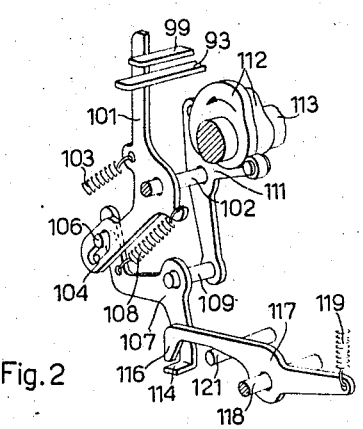
FIG. 2 is a partial right hand rear perspective view of a detail of a control mechanism for the tape feeding device.

Control means are provided for operating the levers 93 and 99, comprise an advancing control lever 101 (FIG. 2) fulcrumed on a stationary shaft 102 and normally, as shown, urged counterclockwise to an ineffective position by a spring 103. The lever 101 is provided with a L-shaped cam slot 104 whereinto these normally reaches a pin 106 of a lever 107. The lever 107 is fulcrumed on a pivot 109 carried on another lever 111 which is fulcrumed on the shaft 102. A spring 108 urges the levers 101 and 107 to swing in opposite directions so that the pin 106 normally occupies the position in the L-shaped slot 104 as seen in FIGURE 2. The lever 111 is rockably controlled by a pair of complementary cams 112 which are secured to a main shaft 113 and are adapted to be cyclically rotated 360 degrees therewith each time a code combination is received by the teleprinter.

Furthermore, the lever 107 is provided with a lug 114 which is adapted to cooperate with a projection 116 of a lever 117 fulcrumed on a stationary shaft 118 and is under constant urge by a spring 119 to contact a member 121. Such member 121 is lowered in a known manner each time a code combination is received which is to be punched, for example the code combination representative of "Who are you?" or one causing a Bell etc.

The manual lever 123 (FIG. 3) is provided for causing a single back space of the tape 17 to take place. The lever 123 is fulcrumed on a stationary pivot 124 and is provided with a movement limiting slot 126. Fulcrumed on a pin 130 of the lever 123 is a latch 129 urged by a spring 127 to contact a lug 131 of a lever 132. The spring 127, by so urging the latch 129 into contact with the lug 131 causes the back space control lever 123 to stand normally rearwardly urged to the limit of the slot 126 as shown in FIG. 3. The lever 132 is fulcrumed on a stationary pivot 133 in the aspect seen in FIG. 3 and is urged by a spring 134 clockwise so that a shoulder 135 thereon blocks normally a lug 136 of a slide 137. The slide 137 is urged by a spring 141 so that its lug 136 normally contacts the shoulder 135 of the lever 132. The slide 137 is provided with a notch 138 to give it slidable support on a stationary pin 139.

The slide 137 is also provided with a projection 142 which is adapted to cooperate with a projection 143 of the latch 129. Another projection 144 of the slide 137 is adapted to cooperate with the lever 93 (FIG. 1). Finally, the slide 137 is provided with a tooth 146 (FIG. 3) adapted to cooperate with a lug 147 of a lever 148 fulcrumed on a stationary pivot 149, the lever being constantly reciprocated by a pair of complementary cams 151 secured to the constantly turning shaft 4.

The punching apparatus operates as follows.

When a code combination is received by the teleprinter, the main shaft 113 (FIG. 2) is cycled one revolution counterclockwise in a known manner. The bars 6 (FIG. 1) selectively set up the interponents 9 according to the received code combination. The interponents 9 corresponding to the code units to be perforated engage with the notch 18 the universal bar 19, while the other interponents 9 disengage the notch 18 from the bar 19.

Near the end of the cycle of the shaft 113 (FIG. 2), the cams 112 rock the lever 111 clockwise, whereby the pin 109 displaces the lever 107 leftwards in FIG. 2. In turn the lever 107 through the pin 106 rocks the lever 101 clockwise, whereby the levers 93, 99 (FIG. 1) are simultaneously rocked counterclockwise. Thus the lever 93 displaces the sleeve 54 leftwards in FIG. 1, to cause the tooth 58 to move into alignment with the tooth 52 and thus to cause the start of clockwise rotation of the sleeve 47. Concomitantly, the lever 99 rocks the lever 91 clockwise, and this displaces the sleeve 34 rightwards. Resultingly, the tooth 37 moves into cooperative alignment with the tooth 33, thus starting the counterclockwise rotation of the sleeve 27. Therefore, the sleeve 34, via the pinions 61, 59, the sleeve 54 and through the pinion 72 acts on the wheel 73 to rotate the sun gear 77 counterclockwise, while the sleeve 34 via the sleeve 27 acts through the pinion 69 and the wheel 71 to rotate the sun gear 76 clockwise at a speed equal to that of the sun gear 76. The planetary gear 78 is thus idly rotated counterclockwise on the pivot 79, so that for the time being the position of such pivot remains unaffected and so that consequently the roller 81 is rotated.

While the sleeves 34, 54, 27 and 47 move through a half-turn, the cams 26, which are rotated together with the sleeve 27, rock the bail 23 first counterclockwise and then clockwise, whereby those interponents 9 which are selected and engage the bar 19 are reciprocated and thus cause the corresponding punches 14 to perforate the tape 17. Before the end of the above hapepnings the stationary cam 63 is engaged by one of the pins 62, so that the sleeve 54 is returned rightwards to turn idly. Resultingly, the lever 93 is returned clockwise in the respect viewed in FIG. 1, and through the projection 96 and the pin 97, rocks the lever 91 counterclockwise, whereby the sleeve 34 is returned leftwards to its shown normal position, the sleeves 34 and 27 nevertheless completing their half turns. Incidental to the cams 26 rocking the bail 23 clockwise, the bar 19 returns the interponents 9 downwards, whereas the comb portions 25 restores the punches 14. The sleeve 47 upon being rotated 180 degrees is stopped by one of the teeth 66, which strikes the cylindrical portion 67 of the sleeve 54. This completes the cycle of the clutch 46, and consequently the sun gear 77 is stopped.

However, after the sun gear 77 has been stopped, the sleeve 27 is rotated a further 180 degrees together which thereby rotates the sun gear 76. Therefore, the planetary gear 78 is now driven by the sun gear 76 and in doing so is now caused to roll in geared mesh with the sun gear 77 directionally clockwise about the center of the shaft 74. In doing so it drives the pivot 79, together with the shaft 74 clockwise through an angular stroke which is half the angular stroke which the sun gear 76 receives from the sleeve 27 in its second half turns. Consequently also the roller 81 is rotated clockwise and through the pinions 88 and 89 rotates the counterroller 82 in the opposite direction. As the sleeve 27 completes its 360 degrees turn it becomes arrested in its normal position by the tooth 42, which moves against and then abuts the cylindrical portion 43. Thus the tape 17 upon being punched in the first half revolution of the sleeve 27 has become advanced a single advance step in a second half revolution of the same sleeve. It is to be observed that during the first half of the full revolution of the sleeve 27, the sleeve 47 has concomitantly received a half revolution.

When the teleprinter receives a code combination which is not required to be perforated, the code bars 6 are set up in a manner similar as hereinabove explained. However, adjunctively the member 121 (FIG. 2) becomes pulled downwards, whereby when the cams 112, 113 operate the lever 111 near the end of the cycle the spring 119 rocks the lever 117 counterclockwise. The lever 117 brings thus its projection 116 into the path of the lug 114 of the lever 107. Then, when the lever 111 is rocked clockwise, the lug 114 is arrested by the projection 116, whereby the lever 107 is compelled to rotate counterclockwise on the pivot 109. Consequently the pin 106 slides into the lower portion of the slot 104, and does not rock the lever 101, whereby the levers 93 and 99 remain unoperated. Therefore, the two clutches 28 and 46 (FIG. 1) are not engaged so that on the one hand the punches 14 are not operated and on the other hand the tape 17 is not advanced.

To cause a back spacing operation of the tape 17, the lever 123 (FIG. 3) is manually rocked clockwise and thus displaces the latch 129 upwardly. In being so displaced the latch 129 engages the lug 131 and rocks the lever 132 against the tension of the spring 134, counterclockwise, and thereby releases the lug 136 from the shoulder 135. The slide 137, by the spring 141, consequently becomes rocked counterclockwise on the pin 139 to place its shoulder 146 into the operating path of the lug 147 of the lever 148 which is continuously oscillated by the cams 151 of the shaft 4. The lug 147 of the lever 148 thus engages quickly the shoulder 146 and positively displaces the slide 137 rightwards in FIG. 3, whereby the projection 144 rocks the lever 93 counterclockwise in FIGS. 1 and 3. Responsively, the lever 93 momentarily displaces the sleeve 54 leftwards and thereby starts a cycle of the clutch 46. During such momentary displacement the projection 142 on said slide 137 (FIG. 3) encounters the projection 143 on the latch 129 and rocks such latch counterclockwise. This will disengage the latch 129 from the lug 131, so that the lever 132 under the tension of the spring 134 will move to the normal FIG. 3 position just as soon as the lever 148, by the lug 147, is allowed to restore. It will thus be seen that even though the lever 123 may be held operated, there will be only one back spacing operation for each of its operations. The lever 132 upon becoming restored clockwise by the spring 134 is again capable of being contacted by the lug 136. Furthermore, when the lug 147 allows the slide 137 to be returned leftwards (FIG. 3) by the spring 141, the lever 132 by its shoulder 135 arrests the lug 136, whereby the slide 137 is held rocked clockwise for its shoulder 146 to stand clear of the lug 147.

When the back space control lever 123 is operated, only the sleeve 54 is shifted. Consequently, the sleeve 47 (FIG. 1) is rotated and particularly such sleeve is responsively rotated clockwise to rotate the sun gear 77 counterclockwise 180 degrees. The sleeve 27 and the sun gear 76 meanwhile stand still. The counterclockwise rotation of the sun gear 77 thus drives the planetary gear 78 in geared mesh with the sun bevel gear 76 and causes the pivot 79 to rotate with the shaft 74 counterclockwise one quarter turn thus to back space the roller 81. Obviously, the roller 82 is rotated in the clockwise direction through the pinions 88 and 89. The total effect is that the tape 17 is back spaced one step. Before the sleeve has completed its 180 degrees cyclic rotation the cam 63 engages one of the pins 62 and returns the sleeve 54 rightwards, so that the sleeve 47 becomes stopped after being rotated the required 180 degrees.

It is intended that many changes, improvements and additions of parts may be made to the described structure without departing from the scope of the invention as claimed in the appended claims. For example the device may be incorporated in a card punching apparatus, or in a tape or card reading device.

What is claimed is:

1. A bidirectional step by step feeding device for a record support, for example a punched tape, having a power shaft, a rotatable member for feeding said support, a differential gear system comprising a planetary bevel gear rotatably mounted on a pivot secured to said member perpendicularly to the rotation axis of said member, a pair of sun bevel gears mounted coaxially with said member, and a pair of clutches associated with said sun gears, wherein the improvement comprises:

(a) a first driven pinion comprised in a first clutch of said pair and adapted to positively rotate the associated sun gear, (b) a mutilated portion on said first driven pinion, (c) a first starting element secured to said first driven pinion at an angular position corresponding to said portion, (d) a first driving pinion continuously rotated by said shaft in a predetermined direction and adapted to be displaced axially with respect to said first driven pinion from a rest position to an operate position, (e) a first counterelement secured to said first driving pinion and adapted to engage said first starting element when said first driving pinion is displaced to said operated position, (f) a second driven pinion comprised in a second clutch of said pair and adapted to positively rotate the associated sun gear, (g) two mutilated portions diametrally opposite on said second driven pinion, (h) two starting elements secured to said second driven pinion at angular positions corresponding to said two portions;

(i) a second driving pinion continuously rotated by said first driving pinion in an opposite direction and adapted to be displaced axially with respect to said second driven pinion from a rest position to an operated position, (j) a second counterelement secured to said second driving pinion and adapted to engage one of said two starting elements when said second pinion is displaced to its operated position, said first counterelement and said second counterelement being so located as to simultaneously engage the corresponding starting elements, (k) and means for displacing both said driving pinions to their operated position for advancing said support one step, or for so displacing said second driving pinion only for back spacing said support.

2. A device according to claim 1, comprising in combination:

(1) a stop element for stopping said first driven pinion upon being rotated 360 degrees with said mutilated portion facing said first driving pinion, (m) a pair of second stop elements for stopping said second driven pinion upon being rotated 180 degrees with one of said two mutilated portions facing said second driving pinion, (n) and cam means for positively restoring said second driving pinion substantially upon having rotated said second driven pinion 180 degrees.

3. A bidirectional step by step feeding device for a punched tape of a punching or reading apparatus, having a power shaft, a roller secured to a rotatable second shaft, a rotatable counterroller cooperating with said roller for frictionally pinching said tape therebetween to feed said tape upon rotation of said second shaft, a differential gear system comprising a planetary bevel gear rotatably mounted on a pivot secured to said second shaft perpendicularly thereto, a pair of sun bevel gears rotatably mounted coaxially with said roller, and a pair of clutches associated with said sun gears, wherein the improvement comprises:

(a) a first toothed driven member comprised in a first clutch of said pair and adapted to positively rotate the associated sun gear, (b) a first toothed driving member continuously rotated by said power shaft in a predetermined direction and selectively conditionable for rotating said first driven member during one cycle of said one clutch through a predetermined angular stroke, (c) a second toothed driven member comprised in the second clutch of said pair and adapted to positively rotate the associated sun gear, (d) a second toothed driving member continuously rotated by said first driving member in an opposite direction and selectively conditionable for rotating said second driven member at the same speed of said first driven member during one cycle of said second clutch through half said angular stroke, (e) an advancing control member operable for simultaneously conditioning both said driving members to advance said tape one step by forcing said planetary gear to roll on the sun gear associated with said second clutch upon termination of the rotation of said second driven member, (f) and a back space control member operable for conditioning said second driving member only to back space said tape by forcing said planetary gear to roll on the sun gear associated with said first clutch during the rotation of said second driven member.

4. A bidirectional step by step feeding device for a punched tape of a punching apparatus having a power shaft, a set of selectable punch members, and an actuator for operating the selected punch members, said feeding device comprising a roller secured to a rotatable second shaft parallel to said first shaft, a counter-roller spring urged to contact said roller for frictionally pinching said tape therebetween, a pair of intermeshing pinions one of which is secured to said roller and the other to said counterroller, whereby said tape is fed upon rotation of said second shaft, a differential gear system comprising a planetary bevel gear rotatably mounted on a pivot secured to said second shaft perpendicularly thereto, a pair of sun bevel gears mounted coaxially with said roller, and a pair of clutches associated with said sun gears, wherein the improvement comprises:

(a) a third shaft parallel to said shafts, (b) a first toothed driven member comprised in a first clutch of said pair and rotatably mounted on said third shaft to positively rotate the associated sun gear, (c) a first toothed driving member continuously rotated by said power shaft in a predetermined direction and selectively conditionable for rotating said first driven member during one cycle of said one clutch through 360 degrees, (d) a second toothed driven member comprised in the second clutch of said pair and rotatably mounted on said third shaft to positively rotate the associated sun gear, (e) a second toothed driving member continuously rotated by said first driving member in an opposite direction and selectively conditionable for rotating said second driven member at the same speed of said first driven member during one cycle of said second clutch through 180 degrees,
(f) an advancing control member operable for simultaneously conditioning said driving members to advance said support one step by forcing said planetary gear to roll on the sun gear associated with said second clutch upon termination of rotation of said second driven member,
(g) a back space control member operable for conditioning said second driving member only to back space said tape by forcing said planetary gear to roll on the sun gear associated with said first clutch during the rotation of said second driven member,
(h) and a cam secured to said first driven member and adapted to cyclically operate said actuator substantially during the first half revolution of said first driven member.

References Cited

UNITED STATES PATENTS

| | | | |
|---|---|---|---|
| 2,106,582 | 1/1938 | Wall | 74—125.5 |
| 2,566,945 | 9/1951 | Laze | 74—435 |
| 2,943,505 | 7/1960 | Parks | 74—679 |
| 3,053,129 | 9/1962 | Aronson et al. | 226—152 |
| 3,098,398 | 7/1963 | Ryan | 74—125.5 |
| 3,187,600 | 6/1965 | Seybold | 74—435 |
| 3,230,808 | 1/1966 | Wise et al. | 83—275 |

FRED C. MATTERN, JR., *Primary Examiner.*

W. S. RATLIFF, JR., *Assistant Examiner.*

U.S. Cl. X.R.

74—435, 679